O. H. HANSEN.
MEASURING AND FEEDING DEVICE.
APPLICATION FILED OCT. 2, 1918.

1,318,867.

Patented Oct. 14, 1919.
2 SHEETS—SHEET 1.

INVENTOR-
O. H. Hansen
BY
W. H. Lieber
ATTORNEY-

O. H. HANSEN.
MEASURING AND FEEDING DEVICE.
APPLICATION FILED OCT. 2, 1918.

1,318,867.

Patented Oct. 14, 1919.
2 SHEETS—SHEET 2.

INVENTOR-
O. H. Hansen
BY W. H. Lieber
ATTORNEY-

UNITED STATES PATENT OFFICE.

OSWALD H. HANSEN, OF PORT WASHINGTON, WISCONSIN, ASSIGNOR TO THE WISCONSIN CHAIR COMPANY, OF PORT WASHINGTON, WISCONSIN.

MEASURING AND FEEDING DEVICE.

1,318,867.     Specification of Letters Patent.     Patented Oct. 14, 1919.

Application filed October 2, 1918. Serial No. 256,522.

*To all whom it may concern:*

Be it known that I, OSWALD H. HANSEN, a citizen of the United States, residing at Port Washington, in the county of Ozaukee and State of Wisconsin, have invented a certain new and useful Improvement in Measuring and Feeding Devices, of which the following is a specification.

This invention relates in general to improvements in the construction and operation of devices for measuring and feeding granular materials, and relates more specifically to improvements in feeders adapted to automatically deliver accurately measured quantities of material such as green peas, beans, berries and the like, to the successive buckets of an endless carrier or conveyer.

An object of the invention is to provide a measuring and feeding device which is simple in construction and efficient in operation.

Some of the more specific objects of the invention may be enumerated as follows:—

To provide an exceedingly compact feeder structure which occupies a minimum amount of floor space.

To provide a feeder of simple construction comprising a minimum number of finished parts, thereby minimizing the cost of manufacture of the device.

To provide a feeding mechanism having a minimum number of bearings and other wearing parts, thereby prolonging to a maximum the life of the mechanism.

To provide a feeding device in which gearing, cams and reversing mechanisms are entirely eliminated, and in which the moving parts have rotary motion only, thereby eliminating objectionable noise and producing a smooth operating device.

To provide a feed structure having antifriction main bearings, thereby reducing to a minimum the power required to drive the machine.

To provide a conveyer feeder which may be readily applied to existing conveyers and elevators of standard construction.

To provide a feed mechanism which derives its operating power directly from both chains of a bucket conveyer, thereby avoiding unequal strains in the conveyer chains.

To provide a feed structure which may be quickly and easily assembled and disassembled.

To provide a highly sanitary feeding device in which the surfaces may be enameled and which is devoid of dirt accumulating corners which are not readily accessible for cleaning.

To provide a feeder which positively measures the material and delivers substantially equal quantities to each bucket of the conveyer.

To provide a feed mechanism in which the waste of material is entirely eliminated.

To provide a feeding structure which will not crush or otherwise injure the material handled thereby.

To provide means for facilitating washing of the material while the same is being measured and delivered.

To provide other details of construction and operation which will facilitate manufacture and manipulation and which will enhance the efficiency of feeding devices.

A clear conception of an embodiment of the invention may be had by referring to the drawings accompanying and forming a part of this specification in which like reference characters designate the same or similar parts in the various views.

While the invention has been herein disclosed as specifically applied to a device for feeding measured quantities of green peas to the successive buckets of a bucket elevator, it will be obvious that the various features of novelty are applicable generally to feeding devices for delivering measured quantities of any granular substance.

Figure 1:
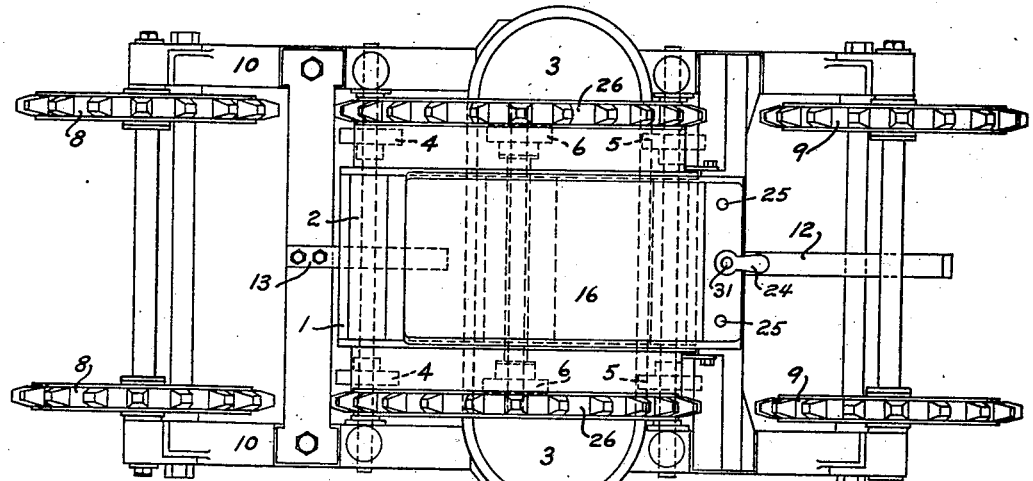
Figure 1 is a top view of a measuring and feeding device.
Figure 2:
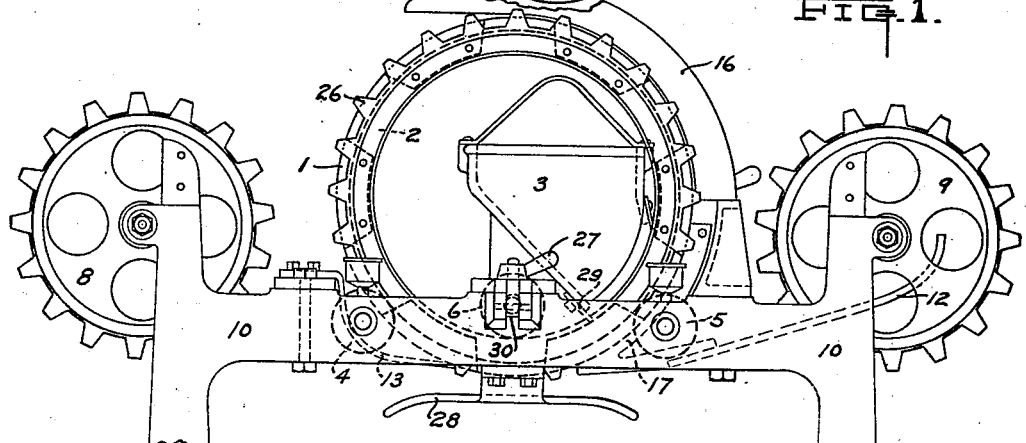
Fig. 2 is a side elevation of the measuring and feeding device.
Figure 3:
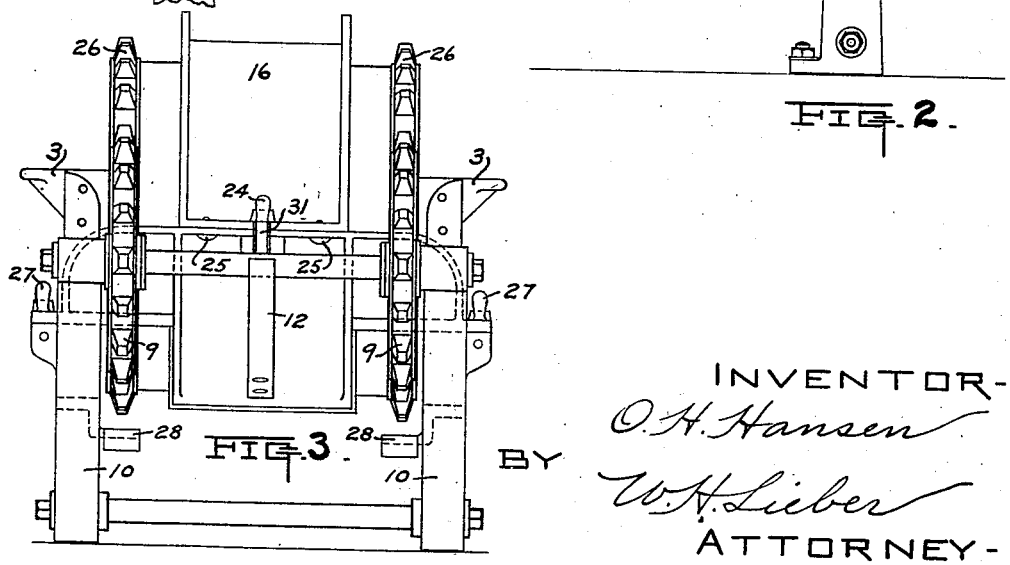
Fig. 3 is a front elevation of the measuring and feeding device.
Figure 7:
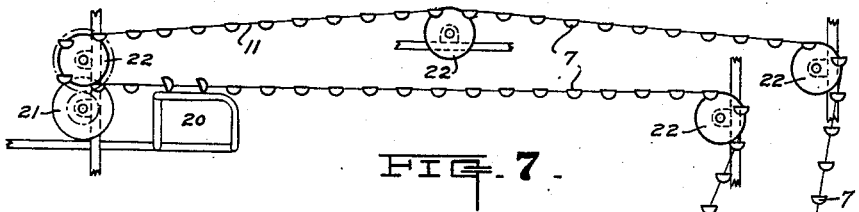
Fig. 7 is a reduced diagrammatic side elevation of a combined bucket elevator and conveyer showing the measuring and feeding device applied thereto.
Figure 6:
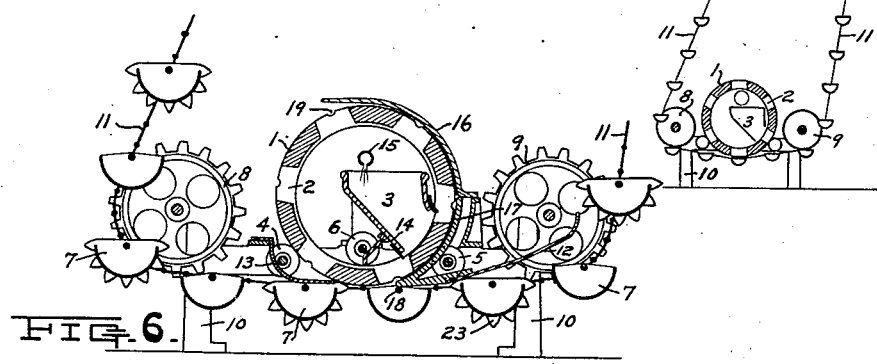
Fig. 6 is a reduced longitudinal vertical sectional view through the measuring and feeding device, showing the elevator buckets and the measuring pockets slightly advanced from the position in which they are shown in Fig. 5.
Figure 5:
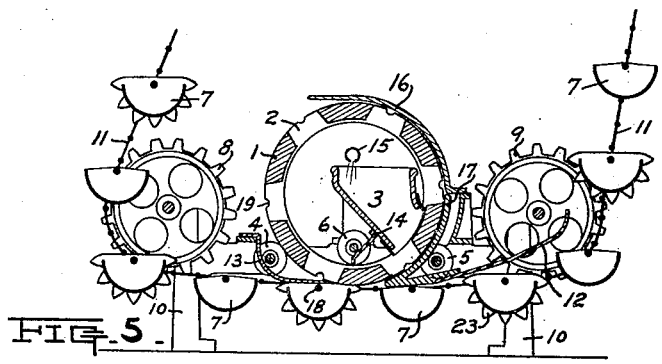
Fig. 5 is a reduced longitudinal vertical sectional view through the measuring and feeding device, showing the elevator buckets and the measuring pockets slightly advanced from the position in which they are shown in Fig. 4.

The combined bucket elevator and conveyer disclosed in Fig. 7, represents a typical installation as ordinarily applied in a canning factory and comprises a pair of laterally spaced parallel endless chains 11 secured to corresponding opposite ends of conveyer buckets 7, and coacting with sprockets 8, 9, 22. These sprockets 8, 9, 22 are arranged in laterally spaced pairs mounted upon counter shafts which are supported in suitable bearings secured to the mill framing. At least one pair of the sprockets 22 is ordinarily made adjustable transversely of the chains 11 in order to enable the taking up of excessive slack in the chains 11. One of the sprocket counter shafts is drivingly connected to a motor 21 or other source of power by means of suitable gearing, thus enabling the motor to gradually advance the endless series of buckets 7. The advancing buckets 7 are automatically successively filled with material, elevated and brought into engagement with an automatic tipping device 20 which discharges the material from the buckets 7 into a suitable receptacle.

The automatic measuring and feeding device which forms the subject of the present invention and which is shown in detail in Figs. 1 to 6 inclusive, comprises in general a main frame 10, in which are journaled four parallel cross-shafts to the forward one of which the laterally spaced front sprockets 9 are attached, to the rear one of which the laterally spaced rear sprockets 8 are attached, and to the two intermediate of which the laterally spaced rollers 5, 4 are secured. The parallel conveyer chains 11 to which the buckets 7 are pivotally secured by means of cross rods 18, coact with the teeth of the sprockets 9, 8 and are adapted to gradually transport the buckets 7 successively through the region below the rollers 5, 4. The conveyer buckets 7 are of standard construction and preferably have perforated bottoms. Alternate buckets 7 have tilting teeth 23 attached to corresponding ends thereof while the intermediate buckets 7 have similar tilting teeth 23 attached to their opposite corresponding ends. The conveyer chains 11 are supported and guided in the region below the rollers 5, 4 by means of lower chain guides 28 which are secured to the side members of the frame 10. The buckets 7 are guided and restrained against upward displacement while passing through the region below the rollers 5, 4, by means of a stationary front guide 12 and a stationary rear guide 13, these guides being adjustably secured to cross elements of the frame 10.

Resting directly upon the rollers 5, 4 and located above the lower horizontal stretch of the bucket conveyer, is an annular body of revolution or ring 1 which has a series of slightly tapered, equally spaced, measuring pockets 2 formed therein. The pockets 2 are spaced apart from center to center, distances equal to the distances between the centers of successive conveyer buckets 7. The ring 1 has laterally spaced sprockets 26 attached to the opposite ends thereof, the teeth of which coact with the two conveyer chains 11. The ring 1 is thus revolved upon the rotary rollers 5, 4 directly by the moving conveyer, receiving power simultaneously from both of the conveyer chains 11.

Within the ring 1 is located a stationary hopper 3 having upwardly open end portions which project beyond the ends of the ring 1. The hopper 3 has a lower discharge opening which is communicable directly with the inner open ends of the successive pockets 2. The front and rear walls of the hopper discharge opening are provided with adjustable plates 29 which may be shifted relatively to the ring 1. The hopper 3 is also provided with a downwardly depending stationary guard plate 14 for preventing material from rolling beyond the feeder discharge opening, see Figs. 4, 5 and 6. A wash water supply pipe 15 may be located above the hopper 3 as shown in these figures, and may be readily removed and inserted. The hopepr 3 is detachably secured to the side members of the main frame 10 by means of manually operable clamping nuts 27 and swivel bolts 30, and may be freely removed endwise from within the ring 1 upon release of the clamping nuts 27. Journaled in the lower portion of the hopper 3 is a cross-shaft to which is secured a pair of laterally spaced rollers 6. These rollers 6 coact with inner cylindrical surfaces of the ring 1 and positively prevent upward displacement of the ring 1 and of the sprockets 26 away from the rollers 5, 4 and the chains 11 respectively.

In proximity to the outer periphery of the ring 1 and directly opposite the discharge opening of the hopper 3, is a segmental wall 17 which is rigidly secured to the main frame 10. This wall 17 extends downwardly from about the horizontal central plane of the ring 1, to a plane somewhat beyond the rear wall of the hopper discharge opening. A suitable stationary guard 16 is detachably secured to the frame 10 by means of screws 25, a manually operated nut 24 and a swing bolt 31, this guard serving to prevent foreign substances from dropping into the outer pocket openings. Other necessary guards may also be provided, such guards having been omitted in order to avoid complication of the disclosure. The various surfaces which are subject to contact with the material being handled, are also preferably enameled or plated to facilitate cleaning thereof.

During the normal operation of the feeder, the conveyer is operated by starting the motor 21, causing the successive buckets 7 to gradually advance and to coöperate with the tilting device 20 to discharge the bucket contents. The buckets 7 after having been emptied, are transported past the several pairs of sprockets 22 and are eventually carried past the lower front sprockets 9 by means of the conveyer chains 11. As the empty buckets 7 move into the region below the rollers 5, 4 they gradually pass the lower extremity of the wall 17 and the bucket cross rods 18 engage the successive peripheral notches 19 of the ring 1. The front guide 12 serves to prevent upward displacement of the buckets 7 while entering the region below the feeder.

Figure 4:
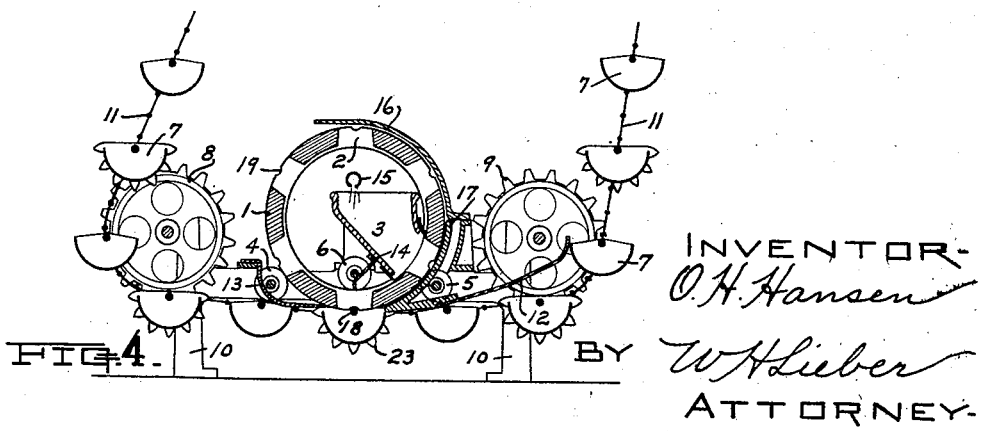
Fig. 4 is a reduced longitudinal vertical sectional view through the measuring and feeding device, showing a fragment of a bucket elevator or conveyer and also showing one of the measuring pockets in full communication with the supply hopper.

While the buckets 7 are thus advancing toward the feeder, the ring 1 is being gradually revolved in a clockwise direction upon the rollers 5, 4, by virtue of the coaction of the ring sprockets 26 with the longitudinally moving chains 11 of the conveyer. As the ring 1 rotates, the measuring pockets 2 are moved in a circular path and are successively brought to positions wherein their inner ends are in open communication with the lower hopper discharge openings, as illustrated in Fig. 4. Material from the hopper 3 is then enabled to flow by gravity into the advancing adjacent pocket 2 and to completely fill the same. The filled pocket 2 continues its advancement to the successive positions illustrated in Figs. 5 and 6. As the pocket 2 reaches the position shown in Fig. 6, communication between the hopper 3 and the filled pocket 2 is automatically being cut off, and the outer extremity of the pocket 2 is being slid beyond the lower extremity of the wall 17, thus opening the outer end of the filled pocket 2 and permitting free discharge of the material from within the pocket, by gravity.

The arrangement and construction of the ring sprockets 26 and of the associated elements, is such that each of the successive pockets 2 will open directly into the center of an advancing bucket 7, as the bucket and the complementary pocket pass the lower extremity of the wall 17. The adjacent pocket 2 and bucket 7 advance simultaneously and at the same rate of speed, being held in proper relation by the coaction of the bucket cross rod 18 with the complementary ring notches 19. After the pocket 2 has delivered its measured contents to a bucket 7, the pocket is carried past the guard 14 and guide 13, being eventually returned to the region of the hopper discharge opening for refilling. The filled bucket 7 is transported past the rear guide 13 and rear sprockets 8, after which it is elevated and conveyed to the tilting device 20. In this manner the successive buckets 7 of the conveyer are automatically supplied with accurately measured quantities of material from the hopper 3 and are transported to the tilting device 20 to deliver their contents to the desired place.

If it is desired to wash the material at the same time that it is being measured and delivered to the buckets 7, wash water may be sprayed over the material within the hopper 3 by means of a water supply pipe 15. This water percolates through the voids of the material in the hopper 3 and filled pockets 2 and is eventually discharged either into the buckets 7 or through the spaces between successive buckets. The water delivered into the buckets 7 will drain therefrom through the perforated bottoms thereof.

Should it be desired to remove the hopper 3, this may readily be accomplished by releasing the nuts 27, swinging back the bolts 30 and withdrawing the hopper 3 and the intermediate rollers 6 which are mounted thereon, endwise from within the ring 1. The ring 1 and the pockets 2 thereof may then be readily cleaned while revolving idly upon the rollers 5, 4. Upon removal of the guard 16, the ring 1 and associated sprockets 26 may be lifted freely away from the rollers 5, 4, thereby completely dismantling the machine. The assembling operation is just as simple, thus producing a device which is readily accessible for cleaning and repairs.

Due to the annular formation of the pocket carrying body 2, the length of the feeder is reduced to a minimum and an exceedingly compact structure results. Only those surfaces which coact with the rollers 4, 5, 6 require reasonably accurate machining which may be done on a lathe, thereby minimizing the cost of manufacture. Practically the only parts of the mechanism which are subjected to wear are the journals for the roller cross shafts, and these are provided with substantial sized grease cups in order to eliminate overheating of the surfaces due to lack of lubrication.

By causing the moving parts to revolve continuously in the same direction, objectionable noises as well as jarring of the elements are eliminated. The roller bearings for the ring 1 furthermore produce a readily operable mechanism in which the power necessary for driving is reduced to a minimum. The fact that there are two sprockets 26, one of which coacts with each chain 11, produces equal pull on both of the driving chains and eliminates tilting of the buckets 7. As the chains 11 are of standard construction and are ordinarily spaced the same distance apart, the present invention may be readily applied to existing conveyers to replace more primitive and inefficient types of feeders.

It will also be obvious that the feeder positively measures the material and delivers substantially equal batches to each bucket 7, since the pockets 2 are of equal volume. There can be no waste of material as the buckets 7 are always transported past the extremity of the wall 17 simultaneously with the pockets 2. The material cannot be crushed or injured as the plate 29 may be adjusted to permit passage of a particle of material of maximum size, between the ring 1 and the adjacent plate edge.

It should be understood that it is not desired to limit the invention to the exact details herein shown for obvious modifications may occur to persons skilled in the art.

It is claimed and desired to secure by Letters Patent:—

1. In combination, a conveyer, a roller in proximity to said conveyer, a movable body resting upon said roller and having a pocket adapted to deliver material to said conveyer, and means engaging an inner portion of said body in proximity to said conveyer to prevent displacement of said body away from said conveyer.

2. In combination, a conveyer, a plurality of rollers in proximity to said conveyer, a movable body resting upon said rollers and having a pocket adapted to intermittently deliver material to said conveyer, and means engaging an inner portion of said body in proximity to said conveyer to prevent displacement of said body away from said conveyer.

3. In combination, a conveyer, a roller in proximity to said conveyer, an annular body resting upon said roller and having a pocket adapted to deliver material to said conveyer, and means engaging an inner portion of said body to prevent displacement of said body away from said conveyer.

4. In combination, a conveyer, a roller in proximity to said conveyer, an annular body resting upon said roller and having a series of pockets adapted to successively deliver material to said conveyer, and means engaging an inner portion of said body to prevent displacement of said body away from said conveyer.

5. In combination, an endless conveyer, rollers mounted in proximity to said conveyer, a body of revolution resting upon said rollers, said body having a pocket adapted to deliver measured quantities of material to said conveyer, and means coöperable with an inner portion of said body for preventing vertical displacement of said body.

6. In combination, a conveyer comprising a series of buckets, a pair of spaced rollers, a body of revolution resting upon said rollers, said body having a measuring pocket communicable with a bucket of said conveyer, and a roller coöperable with an inner surface of said body to prevent vertical displacement thereof.

7. In combination, a conveyer comprising a series of buckets, a pair of rollers spaced longitudinally of said conveyer, a body of revolution resting upon said rollers and rotatable by said conveyer, said body having a measuring pocket communicable with a bucket of said conveyer, and a roller coöperable with an inner surface of said body to prevent displacement thereof away from said first mentioned rollers.

8. In combination, a conveyer comprising a series of buckets, an annular body of revolution having a measuring pocket communicable with a bucket of said conveyer, a supply hopper within said body and providing means of communication with said pocket from both sides of said body, and means for effecting removal of said hopper independently of said body.

9. In combination, a conveyer, an annular body of revolution having a measuring pocket communicable with said conveyer, a supply hopper within said body and communicable with said pocket, and a roller associated with said hopper within said body for preventing displacement of said body away from said conveyer.

10. In combination, a conveyer comprising a series of buckets, an annular body of revolution having a measuring pocket communicable with a bucket of said conveyer, a supply hopper within said body and having portions projecting beyond both ends of said body, and means for effecting removal of said hopper independently of said body.

11. The combination, a bucket conveyer, a body of revolution having a measuring pocket communicable with a bucket of said conveyer, a supply hopper within said body, said hopper having portions extending beyond the ends of said body, means associated with said hopper for preventing displacement of said body away from said conveyer, and means for affecting simultaneous removal of said hopper and said retaining means.

12. In combination, a conveyer having a pair of laterally spaced chains, means for moving said chains, rollers located above said chains, a body of revolution rotatably supported by said rollers, a measuring pocket associated with said body and adapted to deliver material to said conveyer, a pair of sprockets secured to said body and coacting with said chains, and a roller coacting with an inner surface of said body for holding said sprockets in engagement with said chains.

13. In combination, a conveyer having a pair of laterally spaced chains, means for moving said chains, rollers located above said chains, a body of revolution rotatably supported by said rollers, a measuring pocket associated with said body and adapted to deliver material to said conveyer, a hopper within said body adapted to deliver material to said pocket, a pair of sprockets secured to said body and coacting with said chains, and a roller mounted upon said hopper and coacting with an inner portion of said body to maintain engagement between said sprockets and said chains.

14. In combination, a conveyer, a pair of spaced rollers located in proximity to said conveyer, a body resting upon said rollers and having a pocket communicable with said conveyer, and a roller coöperable with an inner portion of said body in proximity to said spaced rollers to prevent displacement thereof away from said first mentioned rollers.

15. In combination, a conveyer, a pair of rotary supports spaced longitudinally of said conveyer, a body resting upon said supports and having a pocket communicable with said conveyer, and rotary means coöperable with an inner portion of said body in proximity to said supports to prevent displacement thereof away from said supports.

16. In combination, a conveyer, a movable body having a pocket communicable with said conveyer, a supply hopper within said body and communicable with said pocket, and means associated with said hopper within said body for preventing displacement of said body away from said conveyer.

17. In combination, a conveyer, a pair of rotary supports spaced longitudinally of said conveyer, a body revoluble upon said supports and having a pocket communicable with said conveyer, a hopper within said body and communicable with said pocket, and means associated with said hopper within said body for preventing displacement of said body away from said conveyer.

In testimony whereof the signature of the inventor is affixed hereto.

OSWALD H. HANSEN.

Copies of this patent may be obtained for five cents each, by addressing the "Commissioner of Patents. Washington, D. C."